United States Patent [19]

French, Jr.

[11] 3,733,444

[45] May 15, 1973

[54] EDIT CONTROL APPARATUS FOR RECORDING EQUIPMENT

[75] Inventor: James French, Jr., Fort Collins, Colo.

[73] Assignee: Video Aid Corporation of Colorado, Loveland, Colo.

[22] Filed: Nov. 12, 1970

[21] Appl. No.: 88,615

[52] U.S. Cl. ....................179/100.2 B

[51] Int. Cl. ....................G11b 27/08

[58] Field of Search ....................179/100.2 B, 100.2 S

[56] References Cited

UNITED STATES PATENTS

| | | | |
|---|---|---|---|
| 3,084,215 | 4/1963 | Bounsall | 179/100.2 B |
| 3,646,260 | 2/1972 | Bolger | 179/100.2 B |
| 3,123,668 | 3/1964 | Silva | 179/100.2 B |

*Primary Examiner*—Bernard Konick
*Assistant Examiner*—Robert S. Tupper
*Attorney*—Thomas E. Schatzel

[57] ABSTRACT

Edit control apparatus for recording equipment comprising, a signal generator for developing first and second cue signals for input to the recording equipment; a signal selector for enabling the first and second cue signals to be recorded by the recording equipment; a signal detector responsive to the recorded cue signal and operative to develop a first output signal, and responsive to the second recorded cue signal and operative to develop a second output signal; and a control network responsive to the first output signal and operative to develop an edit-in signal for actuating the edit-in control of the recording equipment, and responsive to the second output signal and responsive to the second output signal and operative to develop an edit-out signal for actuating the edit-out control of the recording equipment.

1 Claim, 2 Drawing Figures

INVENTOR
JAMES FRENCH JR.
BY Thomas E. Schatzel
ATTORNEY

EDIT CONTROL APPARATUS FOR RECORDING EQUIPMENT

BACKGROUND OF THE PRESENT INVENTION

The present invention generally relates to apparatus for controlling information storage machines such as tape recorders, projectors, and other devices requiring precise control. The apparatus more specifically relates to apparatus for controlling the editing operation of such machines.

The video tape and film industries have continuous demand for replacement, substitution or deletion of portions of the information recorded on the tape or film medium. These demands continuously arise for those involved in commercial, educational, industrial and cable television disciplines having original or/and editing responsibilities. Methods of editing recorded information include the mechanical splicing of the tape (i.e., cutting the tape physically and lining up magnetic flux of each piece of tape), the reshooting of the entire program, and the use of expensive tape recording equipment having automatic editing features. These various methods are economically expensive, time consuming and usually require highly skilled personnel.

SUMMARY OF THE PRESENT INVENTION

The present invention relates to edit control apparatus which may be utilized to control the editing operation of tape recorders and the like.

An exemplary embodiment of the present invention adapted for use in combination with video tape recorders includes an oscillator means for generating identification pulses (cue signals) for application to the cue head of the tape recording machine for recording on the cue track of the magnetic recording medium (to indicate the edit-in or starting point of that portion of the medium to be edited, and to indicate that point on the medium where the edit is to stop — the editout point), means for detecting the recorded edit-in and edit-out signals, and means for generating appropriate control signals for application to the video tape recorder to initiate and subsequently terminate the editing operation.

DESCRIPTION OF PREFERRED EMBODIMENT

Figures 1, 2:
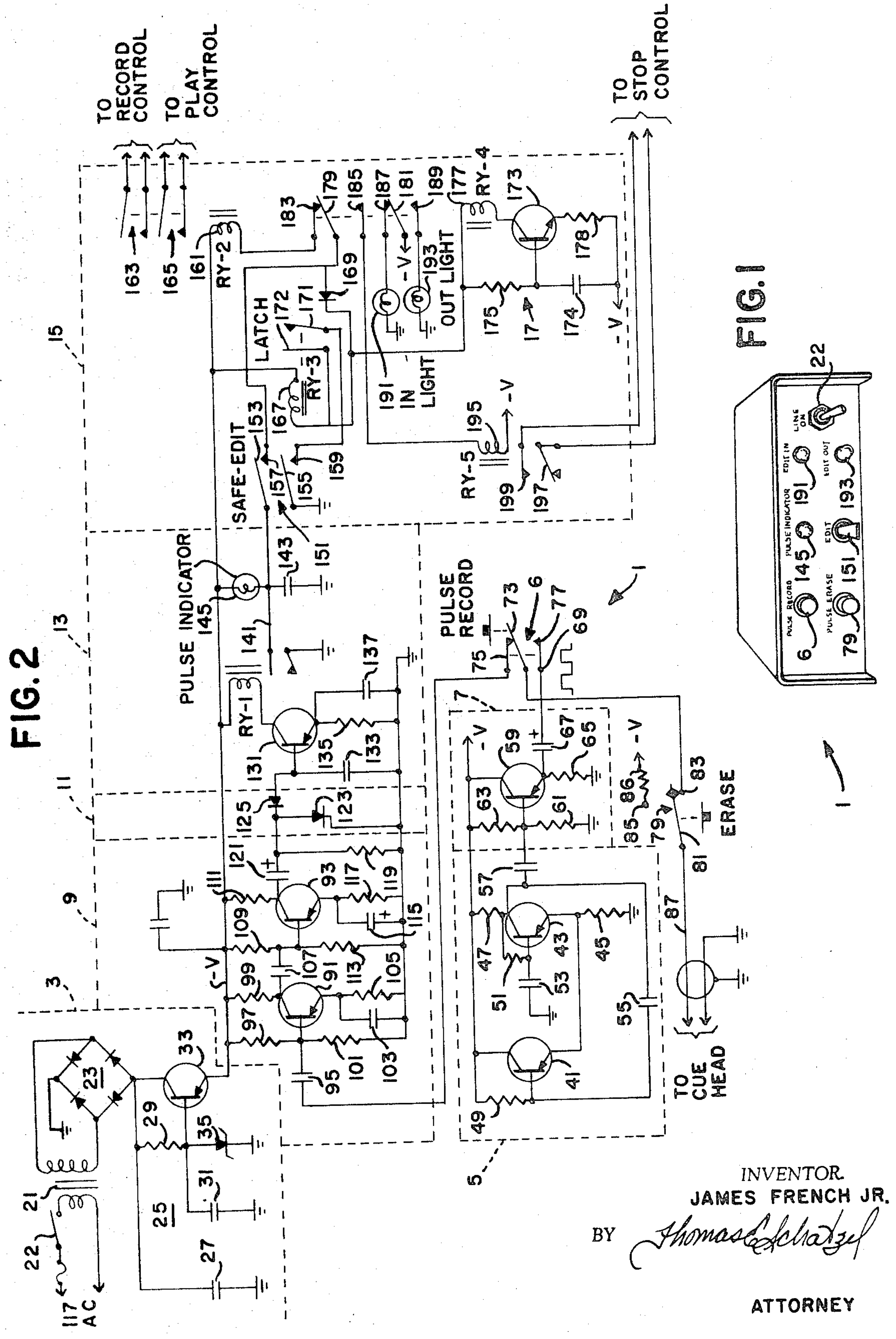
FIG. 1 is a perspective view of the exterior of an edit control apparatus in accordance with the present invention.
FIG. 2 is a circuit diagram of the apparatus of FIG. 1.

FIGS. 1 and 2 illustrate a preferred embodiment of an edit control apparatus in accordance with the present invention which is referred to by the general reference character 1. The editor control apparatus is adapted for incorporation with video tape recorders having editing capabilities and includes a power supply network 3 to provide a direct current voltage-V for the circuitry; a signal generating means to generate identification signals of a desired frequency for recording on the tape of the associated tape recorder by means of the cue head; an emitter follower circuit 7 to aid in matching the impedance of the oscillator network 5 and cue head; and a push button pulse record switch 6 to selectively control the connection of the emitter follower 7 to the cue head and the recording of the identification pulses on the tape. The switch 6 may be actuated to selectively apply identification pulses to the cue head at such time when the tape is in the desired position for the edit to start, i.e., the edit-in point, and then again at such time when the tape is in the desired position for the edit to stop, i.e., edit-out point.

After the identification pulses (cue signals) are recorded on the tape at the selected points, the tape may be replayed. During playback the identification pulses are used to automatically place the video tape recording equipment into the edit mode intermediate the recorded edit-in and edit-out identification pulses. During playback the pulse record switch 6 is placed in the normally closed position interconnecting the cue head and a signal detecting means (pulse amplifier network 9). The amplifier 9 detects and amplifies recorded pulses from the cue track. The amplifier network 9 is tied to a detector network 11 which detects the magnitude of the retrieved pulses and bias' a pulse indicator network 13 indicating the detection of an identification pulse.

The pulse indicator network 13 in turn is tied to a relay-delay control network 15 adapted to control the edit modes of the associated video tape recorder responsive to the detected identification signals. The control network 15 extends to output terminal means designated the record control, the play control and stop control. Said terminal means are to be joined to the associated recorder such that these controls of the recorder respond to the condition of the network 15. A delay circuit 17 is tied in with the control network 15 to precondition the network 15 to respond to a succeeding edit-out identification pulse.

The power supply network includes a transformer 21 for receiving an a.c. line voltage through a power control switch 22. A full-wave bridge rectifier 23 is tied across the secondary and extends to a filter stage 25. The filter stage 25 includes a capacitor 27 extending from the bridge 23 to ground reference. A resistance - capacitance circuit comprising a resistor 29 and capacitor 31 are in parallel with the capacitor 27. The resistor 29 extends across a control valve in the form of a pnp transistor 33. The resistance 29 extends across the collector-base of the transistor 33 with a zener diode 35 extending to ground reference from the base. The d.c. supply potential —V is provided at the emitter of the transistor 33.

The oscillator network 5 is in the form of a square wave generator including a pair of control valves in the form of pnp transistors 41 and 43. The emitters of the transistors are tied in common to each other and to a resistance 45 extending to ground reference. The collector of the transistor 41 is tied to the —V source and the collector of the transistor 43 extends through a resistance 47 to the —V source. The collector of the transistor 41 is tied in common to its base through a resistance 49 and the collector of the transistor 43 is tied to its base through a resistance 51. The base of the transistor 51 is tied to a bypass capacitance 53 to ground reference. The base of the transistor 41 extends to the collector of the transistor 43 and to the output by means of a coupling capacitor 55. A repetitive signal of a desired frequency appears at the output and through a coupling capacitor 57 to the emitter follower 7.

The emitter follower 7 is tied intermediate the oscillator 7 and cue head of the associated tape recorder for impedance matching purposes. Commonly, a square wave oscillator may have an output impedance in excess of a kilohm and a cue head may have an impedance in the order of 10 ohms. The emitter follower 7 includes a control valve in the form of a pnp transistor 59 with the base joined to the capacitor 57, to a resistance 61 tied to ground reference and to a resistance 63 tied to the –V source. The collector of the transistor 59 is also tied to the –V source. The emitter is joined to a resistance 65 extending to ground and to capacitance 67 extending to an output terminal 69. Thus, the generated identification pulses appear at the terminal 69.

The output terminal 69 is common to the two-way switch 6 having an armature 73 and a pair of contacts 75 and 77. The switch 6, hereinafter referred to as the Pulse Record Switch, is connected with the contact 75 common to the input of the amplifier 9, the contact 77 common to the terminal 69 and the armature 73 common to a push-button switch 79. In the normally closed position for the switch 6 the armature 73 is in contact with the contact 75 and the oscillator 5 and emitter follower 7 are isolated. The switch 79, hereinafter referred to as the Erase Switch has an armature 81 and a pair of contacts 83 and 85. In the normally closed position the armature 81 is in contact with the contact 83. The contact 83 is common to the armature 73 of the pulse record switch 6 and the contact 85 is tied to a resistance 86 extending to the source –V. The armature 81 is tied to a conductive line 87 which serves as an electrical connection means to be tied in common with the cue track of the audio magnetic head of the video tape recorder associated with the programmer 1. Thus, with the switch 6 in the record position and the armature 73 in contact with the terminal 77, the identification pulses are delivered to the line 87 for application to the cue head and recording. With the switch 6 in a detect position such that the armature 73 is in contact with the terminal 75, the apparatus 1 is in position to detect identification read by the cue head.

With the Erase Switch 79 and Pulse Record Switch 6 in the normally closed positions, the cue head is connected with the amplifier network 9. The network 9 includes a pair of control valves in the form of pnp transistors 91 and 93. The base of the transistor 91 is tied to a capacitor 95 common to the contact 75. The base and collector of the transistor 91 respectively extend to the –V source through a pair of resistances 97 and 99. The base is tied to ground reference through a resistance 101, while the emitter extends to ground reference by means of a parallel resistance - capacitance network of a capacitance 103 and resistance 105. A coupling capacitor 107 extends between the collector of the transistor 91 and base of the transistor 93. The transistor 93 is connected similarly to that of the transistor 91 with the base and collector respectively tied to the –V source through a pair of resistances 109 and 111. The base is tied to ground reference by means of a resistance 113, while the emitter extends to ground reference by means of a parallel resistance - capacitance network of a capacitance 115 and a resistance 117. A load resistance 119 extends between ground reference and a coupling capacitor 121 tied to the collector of the transistor 93. The output of the amplifier 9 is received by the detector network 11. The detector network 11 is designed to detect a retrieved indication pulse distinguishable from a noise or otherwise spurious signal.

The network 11 includes a pair of undirectional conductive devices in the form of a pair of diodes 123 and 125. The cathode of the diode 123 is at ground reference and the anode is common to the output of the amplifier 9 and to the cathode of the diode 125. The detector network 11 rectifies the a.c. components of the signal from the amplifiers 9 to a negative d.c. signal due to the polarity of the diode 125. The anode of the diode 125 extends to the pulse indicator network 13.

The pulse indicator network 13 includes a control valve in the form of a pnp transistor 131 having the base common to the anode of the diode 125 and to a capacitor 133 extending to ground reference level. The emitter is common to a grounded resistance 135 and grounded capacitance 137. The collector of the transistor 131 is tied in series with the coil of a relay RY–1. The armature of the relay RY–1 is grounded and adapted to make electrical contact with a line 141. The line 141 is grounded through a bypass capacitor 143. A pulse indicator, in the form of a lamp 145 extends across the line 141 and the –V source. Thus, the negative signal received by the transistor 131 places the transistor 131 in a conductive state and pulls in the relay RY–1.

The control network 15 includes a double-pole-single-throw switch 151 hereinafter referred to as the safe-edit switch. The switch 151 includes a pair of ganged armatures 153 and 155 and a pair of contacts 157 and 159. In the safe position, the armatures 153 and 155 are out of contact with the terminals 157 and 159 and in the edit position the armatures are in contact with the terminals 157 and 159. A relay RY–2 having an energizing coil 161 tied to the –V source has a pair of sets of contacts 163 and 165 respectively tied to lines extending to the record control and play control of the associated video tape recorder. The safe-edit switch 151 extends to a latch relay RY–3, having an energizing coil 167 tied to the –V source and to a diode 169 common to the contact 157 of the switch 151. The relay RY–3 has an armature 171 common to the contact 159 of the safe-edit switch 151 and a contact 172 common to the coil 167 and to the delay circuit 17.

The delay circuit 17 includes a control valve in the form of an npn transistor 173. The base of the transistor 173 is tied to a capacitance 174 common to the supply –V and to a resistance 175. The resistance 175 is common to the contact 172 and to one side of an energizing coil 177 of a relay RY–4. The coil 177 is tied to the collector of the transistor 173. The emitter is tied to a resistance 178 common to the source –V. The relay RY–4 includes a pair of ganged armatures 179 and 181. The armature 179 is associated with a pair of contacts 183 and 185. The armature 181 is tied to the –V source and associated with a pair of contacts 187 and 189. The contact 187 is tied in series to ground reference with an indicator in the form of a lamp 191, hereinafter referred to as the In Light. The contact 189 is tied in series to ground reference with an indicator in the form of a lamp 193, hereinafter referred to as the Out Light. The contact 185 extends to an energizing coil 195 of a relay RY–5 which is tied to the –V source. The relay RY–5 includes an armature 197 and a contact 199. The armature 197 and contact 199 extend to a stop control of the associated video tape recorder.

In operation, the operator desiring to make an edit, places the safe-edit switch 151 in the safe position. The associated tape recorder is controlled such that the tape is positioned with the selected point of commencing the edit adjacent the cue head on the recorder. The pulse record switch 6 of the program control apparatus 1 is pushed momentarily to record a pulse or pulses on the cue track of the tape at the selected point. These recorded indication pulses are referred to as the edit in pulse or pulses. Preferably, the pulse record switch 6 is activated for a time period less than the time delay of the delay circuit 17 to avoid having an edit in train of pulses of a duration longer than the delay. The tape recorder is then controlled such that the tape is advanced to the selected point where the edit is to stop and the pulse record switch 6 is again momentarily pushed to record a pulse or train of pulses on the cue track of the tape at the edit out select point. These recorded indication pulses are referred to as the edit out pulse or pulses. The tape is then rewound so that the edit in pulses are adjacent or preceding the cue head. The safe-edit switch 151 of the control apparatus 1 is then placed in the edit position. The tape is then advanced. The edit in pulses are retrieved from the tape via the cue head, the normally closed erase switch 79, the normally closed pulse record switch 6 to the input of the transistor 91. The retrieved pulse is amplified by the amplifier 9. The amplified a.c. signal from the amplifier is detected and rectified by the detector 11 to provide a negative bias to the transistor 131. The transistor 131 conducts and the armature of the relay RY–1 is pulled in providing a conductive path between the source −V and ground through ground reference and lighting the indicator lamp 145.

With the safe-edit relay 151 in the edit position, a ground reference return is provided through the contacts of RY–1, armature 153 and contact 157 of switch 151, armature 179 and contact 183 of relay RY–4 and coil 161 of relay RY–2. Thus, the armatures of relay RY–2 are pulled in, thereby energizing the record (edit) circuits of the associated video tape recorder. Also, a d.c. ground reference path is provided through the diode 169 and coil 167 of the latch relay RY–3. The armature of the latch relay is thus pulled in which commences the charge on the capacitor 174 of the delay circuit 17. The charge time is set by the value of the capacitor 174. When the capacitor 174 is adequately charged, the transistor 173 conducts, energizing the coil 177 and pulling the armatures 179 and 181 respectively, in contact with the contacts 185 and 189. The In Light 193 is thus turned off and the Out Light 191 is energized. The associated video tape recorder remains in the edit in condition until the edit-out identification pulse recorded on the tape is sensed by the cue head. Then the delay-relay network 15 routes the pulse through the coil of the relay RY–5. The armature 197 thus contacts the contact 199 providing a stop or edit out control signal to the tape recorder. To reset the programmer 1 in preparation for further edit programming, the safe-edit switch 15 is returned to the safe position. The In Light 191 is excited and the procedure may be repeated as desired.

Undesired identification pulses may be erased form the cue track of the tape by pushing the erase switch 81 and advancing the tape over the cue head. The negative d.c. potential at the terminal 85 is applied to the head and erases the recorded signal. If desirable, an a.c. potential may be used to erase.

The identifications placed on the recording medium may take forms other than a recorded pulse. For example, light reflective bodies may be adhered to the medium at the select edit in and edit out positions. The medium is then moved past a photosensitive cell positioned adjacent to the travel path of the medium. With the edit in indication adjacent the cell, the cell generates a responsive signal received by the amplifier.

The edit programmer of the present invention, as used with video tape recorders having editing capabilities, is operable in connection with helical scan and rotary head format recorders, and with recorders of various tape widths. The programmer may further be used in connection with film projectors and the like.

I claim:

1. Edit control apparatus for recording equipment having edit-in means for causing said recording equipment to commence editing a strip of magnetic tape when a first switching means is closed, edit-out means for causing said recording equipment to terminate editing said strip of magnetic tape when a second switching means is closed, cue record means for recording cue signals on said strip, and cue playback means for playing back the recorded cue signals, comprising:

signal generating means for developing first and second cue signals for input to said cue record means;

means for selectively coupling said first and second cue signals to said cue record means;

signal detecting means coupled to said cue playback means, said detecting means being responsive to the recorded first cue signal and operative to develop a first output signal, and responsive to the second recorded cue signal and operative to develop a second output signal;

a first source of potential and a second source of potential;

first switching means for activating said edit-in means;

second switching means for activating said edit-out means;

third switching means having a first armature and a first contact, said first armature being coupled to said second source of potential;

fourth switching means having a second armature, a second contact and a third contact, said second armature normally engaging said second contact;

fifth switching means having a third armature coupled to said second source of potential and a fourth contact coupled to said second armature;

a diode coupling said first contact to said fourth contact;

a first relay coil connected between said first source of potential and said second contact and operative to close said first switching means when said second armature engages said second contact and said third armature engages said fourth contact;

a second relay coil connected between said first source of potential and said third contact and operative to close said second switching means when said second armature engages said third contact and said third armature engages said fourth contact or when said first armature engages said first contact;

a third relay coil connected between said first source of potential and said first contact and operative to cause said first armature to engage said first contact when said third armature engages said fourth contact;

delay means including a fourth relay coil coupled between said first source of potential and said first contact and operative to cause said second armature to dis-engage said second contact and engage said third contact a predetermined time after said third armature engages said fourth contact; and means responsive to said first and second output signals and operative to cause said third armature to engage said fourth contact.

* * * * *